(12) United States Patent
Crandall et al.

(10) Patent No.: US 9,729,048 B2
(45) Date of Patent: Aug. 8, 2017

(54) APPARATUS AND METHODS FOR CHARGE PUMPS FOR RADIO FREQUENCY SYSTEMS

(71) Applicant: Skyworks Solutions, Inc., Woburn, MA (US)

(72) Inventors: Jonathan Christian Crandall, Marion, IA (US); Robert Michael Fisher, Center Point, IA (US); Curtis Lee Mayberry, Cedar Rapids, IA (US)

(73) Assignee: SKYWORKS SOLUTIONS, INC., Woburn, MA (US)

( * ) Notice: Subject to any disclaimer, the term of this patent is extended or adjusted under 35 U.S.C. 154(b) by 0 days.

(21) Appl. No.: 14/816,585

(22) Filed: Aug. 3, 2015

(65) Prior Publication Data

US 2016/0036320 A1    Feb. 4, 2016

Related U.S. Application Data

(60) Provisional application No. 62/032,803, filed on Aug. 4, 2014.

(51) Int. Cl.
*H04B 1/40*    (2015.01)
*H02M 3/07*    (2006.01)

(52) U.S. Cl.
CPC .................................... *H02M 3/07* (2013.01)

(58) Field of Classification Search
CPC ............ H02M 3/07; H04B 1/44; H04B 1/401
See application file for complete search history.

(56) References Cited

U.S. PATENT DOCUMENTS

| | | |
|---|---|---|
| 4,433,253 A | 2/1984 | Zapisek |
| 6,169,444 B1 | 1/2001 | Thurber, Jr. |
| 6,249,446 B1 | 6/2001 | Shearon et al. |
| 6,320,797 B1 * | 11/2001 | Liu ........................ G11O 5/147 365/189.05 |
| 6,385,065 B1 | 5/2002 | Roohparvar et al. |
| 6,512,411 B2 | 1/2003 | Meng et al. |
| 6,731,512 B2 | 5/2004 | Nebrigic et al. |
| 6,859,091 B1 | 2/2005 | Nicholson et al. |
| 6,873,203 B1 | 3/2005 | Latham, II et al. |
| 6,989,999 B2 | 1/2006 | Muramatsu et al. |
| 7,142,041 B2 | 11/2006 | Somerville |
| 7,170,271 B2 | 1/2007 | Coffey et al. |
| 7,190,598 B1 | 3/2007 | Alenin |

(Continued)

*Primary Examiner* — M D Talukder
(74) *Attorney, Agent, or Firm* — Knobbe Martens Olson & Bear LLP (57) ABSTRACT

Apparatus and methods for charge pumps are disclosed herein. In certain configurations, a charge pump includes a mode control circuit, a clock generation circuit that generates a clock signal, two or more switched capacitors, and a capacitor charging circuit used to charge the switched capacitors in response to transitions of the clock signal. The mode control circuit can be used to operate the charge pump in one of a plurality of modes associated with different clock signal oscillation frequencies and with different power supply voltages of the capacitor charging circuit. For example, in certain configurations, the selected mode can control an oscillation frequency of clock signal and a voltage level of a power supply voltage used by the capacitor charging circuit when charging the switched capacitors.

20 Claims, 7 Drawing Sheets

(56) References Cited

U.S. PATENT DOCUMENTS

| | | | |
|---|---|---|---|
| 7,271,642 B2 * | 9/2007 | Chen | H02M 3/07 315/291 |
| 7,276,960 B2 | 10/2007 | Peschke | |
| 7,368,979 B2 | 5/2008 | Govindu et al. | |
| 7,394,673 B2 | 7/2008 | Oyama et al. | |
| 7,397,677 B1 | 7/2008 | Collins et al. | |
| 7,430,133 B1 | 9/2008 | Mcintyre et al. | |
| 7,474,161 B2 | 1/2009 | Azuhata et al. | |
| 7,501,882 B2 | 3/2009 | Rasaratnam | |
| 7,511,977 B2 | 3/2009 | Oyama et al. | |
| 7,522,433 B2 | 4/2009 | Delano et al. | |
| 7,583,133 B2 | 9/2009 | Ivanov et al. | |
| 7,605,638 B2 | 10/2009 | Nagasawa et al. | |
| 7,622,984 B2 | 11/2009 | Lesso et al. | |
| 7,626,445 B2 | 12/2009 | Lesso et al. | |
| 7,847,621 B2 | 12/2010 | Oyama et al. | |
| 7,851,946 B2 | 12/2010 | Oyama et al. | |
| 7,990,742 B2 | 8/2011 | Lesso | |
| 8,040,174 B2 | 10/2011 | Likhterov | |
| 8,040,701 B2 | 10/2011 | Oyama et al. | |
| 8,044,706 B2 | 10/2011 | Saman et al. | |
| 8,044,707 B2 | 10/2011 | Saman et al. | |
| 8,049,553 B2 | 11/2011 | Kim et al. | |
| 8,125,432 B2 | 2/2012 | Ito | |
| 8,134,403 B2 | 3/2012 | Dhuyvetter et al. | |
| 8,242,834 B2 | 8/2012 | Chuang et al. | |
| 8,258,857 B2 | 9/2012 | Adkins et al. | |
| 8,264,273 B2 | 9/2012 | Macfarlane | |
| 8,289,071 B2 | 10/2012 | Miyazaki et al. | |
| 8,310,218 B2 | 11/2012 | Williams | |
| 8,339,186 B2 | 12/2012 | Wang | |
| 8,344,791 B2 | 1/2013 | Adkins et al. | |
| 8,400,122 B2 | 3/2013 | North et al. | |
| 8,427,851 B2 | 4/2013 | Lesso | |
| 8,436,676 B2 | 5/2013 | Shook et al. | |
| 8,461,910 B2 | 6/2013 | Nadimpalli | |
| 8,487,690 B2 | 7/2013 | Wei et al. | |
| 8,508,288 B2 | 8/2013 | Macfarlane | |
| 8,519,777 B2 | 8/2013 | Brown | |
| 8,519,788 B2 | 8/2013 | Khlat | |
| 8,525,564 B2 | 9/2013 | Schober et al. | |
| 8,542,061 B2 | 9/2013 | Levesque et al. | |
| 8,582,332 B2 | 11/2013 | Verma et al. | |
| 8,593,213 B2 | 11/2013 | Neugebauer | |
| 8,604,869 B1 * | 12/2013 | Ma | H02M 3/07 327/143 |
| 8,618,867 B2 | 12/2013 | Singnurkar | |
| 8,710,910 B2 | 4/2014 | Wang | |
| 8,710,911 B2 | 4/2014 | Chien | |
| 8,717,088 B2 | 5/2014 | Vereb et al. | |
| 8,742,834 B2 | 6/2014 | Motoki et al. | |
| 8,742,835 B2 | 6/2014 | Lin et al. | |
| 8,791,748 B2 | 7/2014 | Nishida et al. | |
| 8,829,979 B2 | 9/2014 | Galal et al. | |
| 8,841,891 B2 | 9/2014 | Williams | |
| 8,854,019 B1 | 10/2014 | Levesque et al. | |
| 8,890,604 B2 | 11/2014 | Lesso et al. | |
| 8,981,838 B1 | 3/2015 | Chuang | |
| 9,065,392 B2 | 6/2015 | Myles | |
| 9,136,755 B2 | 9/2015 | Lesso et al. | |
| 9,236,794 B2 | 1/2016 | Lesso | |
| 9,236,796 B2 | 1/2016 | Liu et al. | |
| 9,281,743 B1 * | 3/2016 | Oner | H02M 3/073 |
| 9,329,613 B2 | 5/2016 | Ting | |
| 9,350,234 B2 | 5/2016 | Verma et al. | |
| 9,379,667 B2 | 6/2016 | Khlat et al. | |
| 2002/0093854 A1 * | 7/2002 | Liu | G11O 5/147 365/189.11 |
| 2006/0165204 A1 | 7/2006 | Shumarayev et al. | |
| 2007/0146051 A1 * | 6/2007 | Tsen | H02M 3/07 327/536 |
| 2011/0204961 A1 * | 8/2011 | Galal | H02M 3/07 327/536 |
| 2012/0049936 A1 * | 3/2012 | Adkins | H02M 3/07 327/536 |
| 2014/0307493 A1 * | 10/2014 | Chevalier | H02M 3/07 363/60 |
| 2016/0036320 A1 * | 2/2016 | Crandall | H02M 3/07 455/77 |

* cited by examiner

APPARATUS AND METHODS FOR CHARGE PUMPS FOR RADIO FREQUENCY SYSTEMS

CROSS-REFERENCE TO RELATED APPLICATIONS

This application claims the benefit of priority under 35 U.S.C. §119(e) of U.S. Provisional Patent Application No. 62/032,803, filed Aug. 4, 2014 and titled "APPARATUS AND METHODS FOR CHARGE PUMPS," which is herein incorporated by reference in its entirety.

BACKGROUND

Field

Embodiments of the invention relate to electronic systems, and in particular, to charge pumps for radio frequency systems.

Description of the Related Technology

Charge pumps can be included in a variety of electronic systems. For example, an integrated circuit (IC) may be powered using a power high supply voltage and a power low supply voltage, and the IC can include one or more charge pumps for generating a charge pump output voltage above the IC's power high supply voltage and/or below the IC's power low supply voltage.

In one example, a wireless device can include RF switches that are controlled in part using a charge pump voltage generated by a charge pump. For instance, a charge pump can be used to generate a negative charge pump voltage for biasing the gate voltage of one or more n-type metal oxide semiconductor (NMOS) switch transistors when operating in an off state. Controlling the gate voltage of an NMOS switch transistor to a voltage below a power low supply voltage can increase off state impedance, which can enhance isolation and/or improve harmonic performance in multi-band applications.

There is a need for improved charge pumps.

SUMMARY

In certain embodiments, the present disclosure relates to a charge pump. The charge pump includes a mode control circuit configured to operate the charge pump in a selected mode chosen from a plurality of modes, a clock generation circuit configured to generate a charge pump clock signal having an oscillation frequency that is based on the selected mode, two or more switched capacitors, and a capacitor charging circuit. The capacitor charging circuit is configured to charge the two or more switched capacitors based on a power supply voltage of the capacitor charging circuit and on timing of the charge pump clock signal, and the power supply voltage has a voltage level that is based on the selected mode.

In some embodiments, the charge pump further includes a charge pump filter configured to filter a charge pump output voltage of the charge pump. The charge pump filter has a filtering characteristic that is based on the selected mode. In various embodiments, the filtering characteristic includes a resistance of the charge pump filter.

According to a number of embodiments, the capacitor charging circuit includes a plurality of power supply selection switches configured to choose the power supply voltage of the capacitor charging circuit from two or more power high supply voltages based on the selected mode.

In various embodiments, the clock generation circuit includes a first clock generator configured to generate a first clock signal, a second clock generator configured to generate a second clock signal that has a slower oscillation frequency than the first clock signal, and a clock selection circuit configured to generate the charge pump clock signal based on selecting amongst a plurality of clock signals including the first clock signal and the second clock signal.

In several embodiments, the two or more switched capacitors include a first switched capacitor and a second switched capacitor. Additionally, the capacitor charging circuit is configured to charge a first end of the first switched capacitor with the power supply voltage during a first phase of the charge pump clock signal, and to charge a first end of the second switched capacitor with the power supply voltage during a second phase of the charge pump clock signal.

In some embodiments, the charge pump further includes a first charge pump switch configured to electrically connect a second end of the first switched capacitor to a power low supply voltage during the first phase, a second charge pump switch configured to electrically connect the second end of the first switched capacitor to a charge pump output during the second phase, a third charge pump switch configured to electrically connect a second end of the second switched capacitor to the power low supply voltage during the second phase, and a fourth charge pump switch configured to electrically connect the second end of the second switched capacitor to the charge pump output during the first phase. According to certain embodiments, the capacitor charging circuit is further configured to electrically connect the first end of the first switched capacitor to the power low supply voltage during the second phase, and to electrically connect the first end of the second switched capacitor to the power low supply voltage during the first phase.

In a number of embodiments, the two or more modes includes at least three modes.

In certain embodiments, the present disclosure relates to a method of generating a charge pump output voltage. The method includes selecting a mode of operation of a charge pump using a mode control circuit, the selected mode chosen from a plurality of modes. The method further includes controlling a frequency of a charge pump clock signal based on the selected mode using a clock generation circuit. The method further includes charging two or more switched capacitors using a capacitor charging circuit, the charging based on a power supply voltage of the capacitor charging circuit and on timing of the charge pump clock signal. The method further includes controlling a voltage level of the power supply voltage of the capacitor charging circuit based on the selected mode.

In some embodiments, the method further includes controlling a resistance of a charge pump filter based on the selected mode.

In various embodiments, the method further includes generating a plurality of clock signals having different frequencies, and selecting amongst the plurality of clock signals to generate the charge pump clock signal.

In several embodiments, controlling the voltage level of the power supply voltage includes selecting the power supply voltage from two or more power high supply voltages based on the selected mode.

In certain embodiments, the present disclosure relates to a radio frequency system. The radio frequency system includes a power amplifier configured to generate an amplified radio frequency signal, a switch including an input configured to receive the amplified radio frequency signal, a switch controller configured to receive a charge pump output voltage and to control a state of the switch, and a charge pump configured to generate the charge pump output voltage. The charge pump includes a mode control circuit configured to operate the charge pump in a selected mode chosen from a plurality of modes, a clock generation circuit configured to generate a charge pump clock signal having an oscillation frequency that is based on the selected mode, two or more switched capacitors, and a capacitor charging circuit. The capacitor charging circuit is configured to charge the two or more switched capacitors based on a power supply voltage of the capacitor charging circuit and on timing of the charge pump clock signal, and the power supply voltage has a voltage level that is based on the selected mode.

In some embodiments, the charge pump further includes a charge pump filter configured to filter the charge pump output voltage, and the charge pump filter has a filtering characteristic that is based on the selected mode.

In various embodiments, the filtering characteristic includes a filter resistance of the charge pump filter.

In several embodiments, the capacitor charging circuit includes a plurality of power supply selection switches configured to choose the power supply voltage of the capacitor charging circuit from two or more power high supply voltages based on the selected mode.

In a number of embodiments, the clock generation circuit includes a first clock generator configured to generate a first clock signal, a second clock generator configured to generate a second clock signal that has a slower oscillation frequency than the first clock signal, and a clock selection circuit configured to generate the charge pump clock signal based on selecting amongst a plurality of clock signals including the first clock signal and the second clock signal.

In some embodiments, the two or more modes includes at least three modes.

In various embodiments, the two or more switched capacitors include a first switched capacitor and a second switched capacitor. Additionally, the capacitor charging circuit is configured to charge a first end of the first switched capacitor with the power supply voltage during a first phase of the charge pump clock signal, and to charge a first end of the second switched capacitor with the power supply voltage during a second phase of the charge pump clock signal.

DETAILED DESCRIPTION OF EMBODIMENTS

The headings provided herein, if any, are for convenience only and do not necessarily affect the scope or meaning of the claimed invention.

A charge pump's settling time can be an important consideration. For example, in radio frequency (RF) applications, a charge pump with a slow settling time can interfere with system-level timing specifications and/or degrade RF performance, such as by generating harmonics in an RF output signal of a power amplifier. Additionally, an amount of output ripple in a charge pump's output voltage can also be an important consideration. For example, in a front-end module (FEM) application, a frequency spur associated with the output ripple can mix with an RF signal to generate out-of-band emissions and/or spurious noise.

A charge pump can undesirably suffer from a trade-off between settling time and output ripple. In one example, a ratio of a size of a flying capacitor used in the charge pump's switched capacitor circuitry relative to a size of a filter capacitor used in the charge pump's filter may provide a trade-off between settling time and output ripple. In another example, including a resistor in series with a filter capacitor may provide smaller output ripple, but may also degrade the charge pump's settling time.

Although a particular charge pump implementation may achieve a certain trade-off between setting time and output ripple, such performance trade-offs can be non-ideal as one performance specification is improved at the cost of degrading another performance specification.

Provided herein are apparatus and methods for charge pumps. In certain configurations, a charge pump includes a mode control circuit, a clock generation circuit that generates a clock signal, two or more switched capacitors, and a capacitor charging circuit used to charge the switched capacitors in response to transitions of the clock signal. The mode control circuit can be used to operate the charge pump in one of a plurality of modes associated with different clock signal oscillation frequencies and with different power supply voltages of the capacitor charging circuit. For example, in certain configurations, the selected mode controls an oscillation frequency of clock signal and a voltage level of a power supply voltage used by the capacitor charging circuit when charging the switched capacitors.

Configuring the charge pump to selectively operate at different frequencies and different power supply voltages permits the charge pump to be implemented using smaller capacitors relative to a configuration using a fixed frequency and fixed power supply voltage. Thus, the charge pump can achieve a compact area while providing an adjustable mode that can be set to meet settling time and/or output ripple specifications associated with a particular application that the charge pump is being used in.

Accordingly, the charge pump can be used to mitigate or avoid a trade-off between output ripple and settling time that is typically encountered in the design of charge pumps. Furthermore, the charge pump can provide smaller steady-state quiescent current relative to certain fixed-frequency and/or fixed-voltage charge pump configurations.

Overview of Electronic Systems that can Include One or More Charge Pumps

Figure 1:
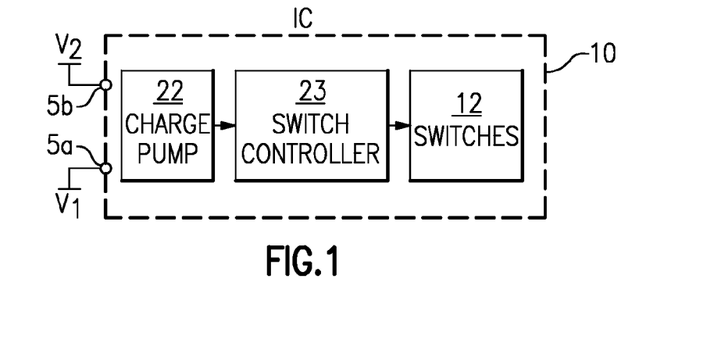
FIG. 1 is a schematic diagram of one example of an integrated circuit (IC) that can include one or more charge pumps.

FIG. 1 is a schematic diagram of one example of an integrated circuit (IC) 10 that can include one or more charge pumps. The illustrated IC 10 includes a first pin 5a that receives a first or power low supply voltage $V_1$ and a second pin 5b that receives a second or power high supply voltage $V_2$. Additionally, the illustrated IC 10 further includes switches 12, a charge pump 22, and a switch controller 23. Although not illustrated in FIG. 1 for clarity of the figures, the IC 10 typically includes additional pins and circuitry.

The charge pump 22 can be used to generate a charge pump output voltage that is below the power low supply voltage $V_1$ or above the power high supply voltage $V_2$. The switch controller 23 receives the charge pump voltage, which can be used in part to control the switches 12. The illustrated IC 10 can represent a front-end module (FEM), an antenna switch module (ASM), or other electronic circuitry.

In one embodiment, the IC 10 is fabricated using a silicon on insulator (SOI) process, and the switches 12 include SOI transistors.

In certain configurations, the charge pump 22 generates a voltage less than the power low supply voltage $V_1$. For instance, a charge pump output voltage can be used to bias the gate voltage of one or more n-type metal oxide semiconductor (NMOS) switch transistors when the NMOS switch transistors operate in an off state. Controlling the gate voltage of an NMOS switch transistor to a voltage below a power low supply can increase off state impedance, which can enhance isolation in multi-band applications. However, other configurations are possible, such as configurations in which the charge pump 22 generates a voltage greater than the power high supply voltage $V_2$.

Figure 2:
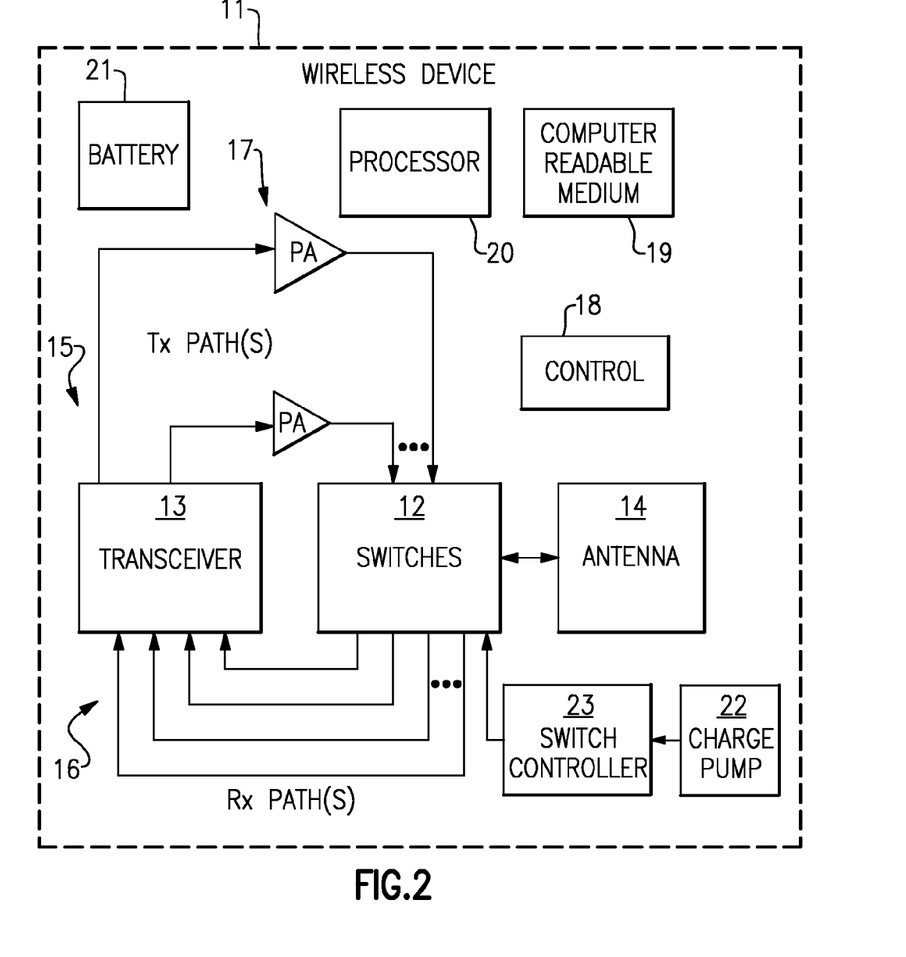
FIG. 2 is a schematic block diagram of an example wireless device that can include one or more charge pumps.

FIG. 2 is a schematic block diagram of an example wireless device that can include one or more charge pumps.

The example wireless device 11 depicted in FIG. 2 can represent a multi-band and/or multi-mode device such as a multi-band/multi-mode mobile phone. In the illustrated configuration, the wireless device 11 includes switches 12, a transceiver 13, an antenna 14, power amplifiers 17, a control component 18, a computer readable medium 19, a processor 20, a battery 21, a charge pump 22, and a switch controller 23.

The transceiver 13 can generate RF signals for transmission via the antenna 14. Furthermore, the transceiver 13 can receive incoming RF signals from the antenna 14.

It will be understood that various functionalities associated with the transmission and receiving of RF signals can be achieved by one or more components that are collectively represented in FIG. 2 as the transceiver 13. For example, a single component can be configured to provide both transmitting and receiving functionalities. In another example, transmitting and receiving functionalities can be provided by separate components.

Similarly, it will be understood that various antenna functionalities associated with the transmission and receiving of RF signals can be achieved by one or more components that are collectively represented in FIG. 2 as the antenna 14. For example, a single antenna can be configured to provide both transmitting and receiving functionalities. In another example, transmitting and receiving functionalities can be provided by separate antennas. In yet another example, different bands associated with the wireless device 11 can be provided with different antennas.

In FIG. 2, one or more output signals from the transceiver 13 are depicted as being provided to the antenna 14 via one or more transmission paths 15. In the example shown, different transmission paths 15 can represent output paths associated with different bands and/or different power outputs. For instance, the two example power amplifiers 17 shown can represent amplifications associated with different power output configurations (e.g., low power output and high power output), and/or amplifications associated with different bands. Although FIG. 2 illustrates a configuration using two transmission paths 15, the wireless device 11 can be adapted to include more or fewer transmission paths 15.

The power amplifiers 17 can be used to amplify a wide variety of RF signals, including, for example, Global System for Mobile (GSM) signals, code division multiple access (CDMA) signals, W-CDMA signals, wireless local area network (WLAN) signals, Long Term Evolution (LTE) signals, and/or EDGE signals.

In FIG. 2, one or more detected signals from the antenna 14 are depicted as being provided to the transceiver 13 via one or more receiving paths 16. In the example shown, different receiving paths 16 can represent paths associated with different bands. Although FIG. 2 illustrates a configuration using four receiving paths 16, the wireless device 11 can be adapted to include more or fewer receiving paths 16.

To facilitate switching between receive and transmit paths, the switches 12 can be configured to electrically connect the antenna 14 to a selected transmit or receive path. Thus, the switches 12 can provide a number of switching functionalities associated with an operation of the wireless device 11. In certain configurations, the switches 12 can include a number of switches that provide functionalities associated with, for example, switching between different bands, switching between different power modes, switching between transmission and receiving modes, or some combination thereof. The switches 12 can also provide additional functionality, including filtering and/or duplexing of signals.

The charge pump 22 can be used to generate a charge pump voltage that can be used for a variety of purposes in the wireless device 11. For example, in certain configurations the charge pump voltage generated by the charge pump 22 can be provided to the switch controller 23 and used in part to bias the switches 12.

FIG. 2 shows that in certain configurations, a control component 18 can be provided for controlling various control functionalities associated with operations of the switches 12, the power amplifiers 17, the charge pump 22, the switch controller 23 and/or other operating component(s). In certain configurations, the control component 18 generates a mode select signal that is provided to the charge pump 22. In such configurations, the control component 18 can control a selected mode of operation of the charge pump 22 over time to achieve desired operation of the wireless device 11.

However, other configurations are possible, such as implementations in which the selected mode of operation of the charge pump 22 is determined based on data stored in a memory of the wireless device 11. For example, in certain configurations, the memory can be a volatile memory programmed to include data corresponding to the selected mode of operation of the charge pump 22 during power-up or turn-on and/or programmed with the data during operation. In other configurations, the memory can be a non-volatile memory, including, for example, a flash memory, a read-only memory (ROM), and/or a memory implemented using fuses and/or anti-fuses, and the non-volatile memory can be programmed with the data during manufacture. In such a configuration, the charge pump 22 can be used in a variety of different applications by programming the memory with a certain charge pump mode suitable for a particular application.

In certain configurations, a processor 20 can be configured to facilitate implementation of various processes described herein. The processor 20 can operate using computer program instructions. These computer program instructions may be provided to the processor 20.

In certain configurations, these computer program instructions may also be stored in a computer-readable memory 19 that can direct the processor 20 or other programmable data processing apparatus to operate in a particular manner.

The battery 21 can be any suitable battery for use in the wireless device 11, including, for example, a lithium-ion battery.

Figure 3:
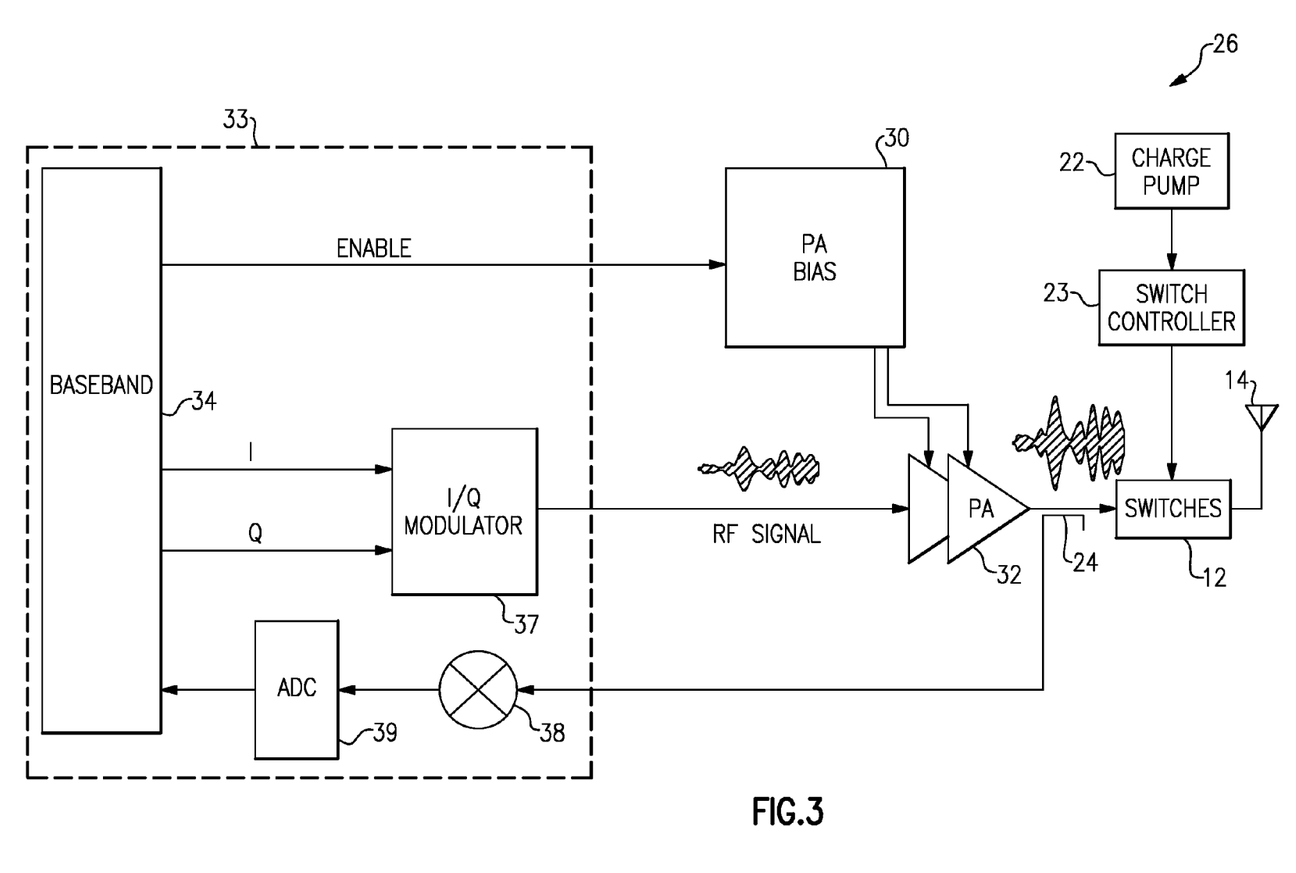
FIG. 3 is a schematic block diagram of one example of a radio frequency system that can include one or more charge pumps.

FIG. 3 is a schematic block diagram of one example of an RF system 26 that can include one or more charge pumps. The illustrated RF system 26 includes the switches 12, the antenna 14, the charge pump 22, the switch controller 23, a directional coupler 24, a power amplifier bias circuit 30, a power amplifier 32, and a transceiver 33. The illustrated transceiver 33 includes a baseband processor 34, an I/Q modulator 37, a mixer 38, and an analog-to-digital converter (ADC) 39. Although not illustrated in FIG. 3 for clarity, the transceiver 33 can include circuitry associated with receiving signals over one or more receive paths.

The baseband signal processor 34 can be used to generate an I signal and a Q signal, which can be used to represent a sinusoidal wave or signal of a desired amplitude, frequency, and phase. For example, the I signal can be used to represent an in-phase component of the sinusoidal wave and the Q signal can be used to represent a quadrature component of the sinusoidal wave, which can be an equivalent representation of the sinusoidal wave. In certain implementations, the I and Q signals can be provided to the I/Q modulator 37 in a digital format. The baseband processor 34 can be any suitable processor configured to process a baseband signal. For instance, the baseband processor 34 can include a digital signal processor, a microprocessor, a programmable core, or any combination thereof. Moreover, in some implementations, two or more baseband processors 34 can be included in the RF system 26.

The I/Q modulator 37 can be configured to receive the I and Q signals from the baseband processor 34 and to process the I and Q signals to generate an RF signal. For example, the I/Q modulator 37 can include DACs configured to convert the I and Q signals into an analog format, mixers for upconverting the I and Q signals to radio frequency, and a signal combiner for combining the upconverted I and Q signals into an RF signal suitable for amplification by the power amplifier 32. In certain implementations, the I/Q modulator 37 can include one or more filters configured to filter frequency content of signals processed therein.

The power amplifier bias circuit 30 can receive an enable signal ENABLE from the baseband processor 34, and can use the enable signal ENABLE to generate one or more bias signals for the power amplifier 32. The power amplifier 32 can receive the RF signal from the I/Q modulator 37 of the transceiver 33, and can provide an amplified RF signal to the antenna 14 through the switches 12.

The directional coupler 24 can be positioned between the output of the power amplifier 32 and the input of the switches 12, thereby allowing an output power measurement of the power amplifier 32 that does not include insertion loss of the switches 12. The sensed output signal from the directional coupler 24 can be provided to the mixer 38, which can multiply the sensed output signal by a reference signal of a controlled frequency so as to downshift the frequency content of the sensed output signal to generate a downshifted signal. The downshifted signal can be provided to the ADC 39, which can convert the downshifted signal to a digital format suitable for processing by the baseband processor 34.

By including a feedback path between the output of the power amplifier 32 and the baseband processor 34, the baseband processor 34 can be configured to dynamically adjust the I and Q signals to optimize the operation of the RF system 26. For example, configuring the RF system 26 in this manner can aid in controlling the power added efficiency (PAE) and/or linearity of the power amplifier 32.

In the illustrated configuration, the charge pump 22 provides a charge pump output voltage to the switch controller 23. In certain configurations, the charge pump output voltage is used by the switch controller 23 to bias the gate voltage of switch transistors of the switches 12. For instance, the charge pump output voltage can be used to bias the gate voltage of one or more NMOS switch transistors when the NMOS switch transistors operate in an off state. However, other configurations are possible.

Overview of Examples of Charge Pump Circuits

Apparatus and methods for charge pumps are disclosed herein. In certain configurations, a charge pump includes a mode control circuit, a clock generation circuit that generates a clock signal, two or more switched capacitors, and a capacitor charging circuit used to charge the switched capacitors based on timing of the clock signal. The mode control circuit can be used to operate the charge pump in one of a plurality of modes associated with different clock signal oscillation frequencies and with different power supply voltages of the capacitor charging circuit. For example, in certain configurations, the selected mode can control an oscillation frequency of clock signal and a voltage level of a power supply voltage used by the capacitor charging circuit when charging the switched capacitors.

Accordingly, the charge pump can operate in one of multiple modes associated with different clock signal oscillation frequencies and different power supply voltages of the capacitor charging circuit. By configuring the charge pump in this manner, the charge pump can operate in a mode that provides a desired trade-off between settling time and output ripple.

For example, the teachings herein can be used to provide a digitally configurable trade-off between output ripple and settling time. For instance, in an application having relatively stringent output ripple specifications, the charge pump operate in a slow oscillation frequency/low power supply voltage mode associated with small output ripple and longer settling time. However, when a faster settling time is desired, the charge pump can be operated in a fast oscillation frequency/high power supply voltage mode to speed-up settling time at the cost of an increase in output ripple.

In configurations in which a fine degree of control over the trade-off between output ripple and settling time is desired, the charge pump can be implemented to operate using three or more modes associated with different clock frequencies and power supply voltages. By selecting a mode associated with an appropriate clock frequency, a desired trade-off between output ripple and settling time for a particular application can be achieved. In certain configurations, a filter resistance of the charge pump's filter can further be controlled based on the charge pump's mode.

By providing a charge pump that can be controlled in this manner, the charge pump can be used in a variety of applications associated with different output ripple and/or settling time specifications. For instance, an integrated circuit that includes the charge pump can have a digitally programmable output ripple versus settling time profile which can enable the integrated circuit to be used in a wide range of applications associated with different performance specifications and/or to have a performance that dynamically changes over time based on operating conditions or needs.

Figure 4A:
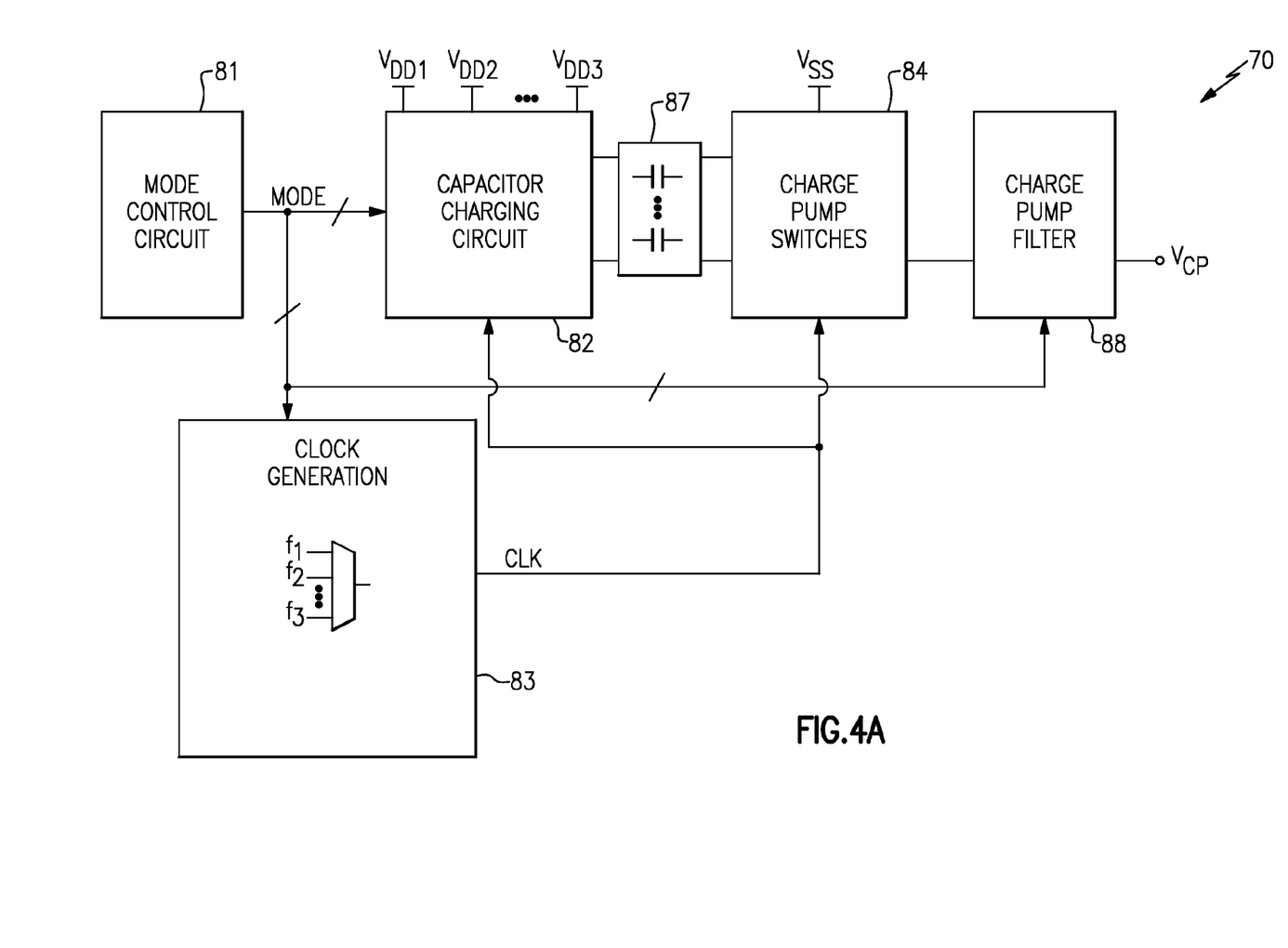
FIG. 4A is a circuit diagram of one embodiment of a charge pump.

FIG. 4A is a circuit diagram of one embodiment of a charge pump 70. The charge pump 70 includes a mode control circuit 81, a capacitor charging circuit 82, a clock generation circuit 83, charge pump switches 84, switched capacitors 87, and a charge pump filter 88.

As shown in FIG. 4A, the charge pump 70 generates a charge pump output voltage on a charge pump output voltage terminal $V_{CP}$. Although the charge pump 70 is illustrated in an open-loop configuration, the charge pump 70 can also be used closed-loop.

The mode control circuit 81 can operate the charge pump 70 in a selected mode of operation. In the illustrated configuration, the mode control circuit 81 generates a mode signal MODE, which can be a multi-bit digital signal in certain implementations. In one embodiment, a state of the mode signal MODE operates the charge pump 70 in a selected mode chosen from three or more modes.

In certain configurations, the mode control circuit 81 receives a mode select signal for determining which mode to operate the charge pump 70 in. For example, the mode selected signal can be provided from a control circuit of a wireless device, such as the control component 18 of FIG. 2. In other configurations, the mode control circuit 81 includes a programmable memory including data corresponding to the selected mode of operation. In one example, the mode control circuit 81 can include a non-volatile memory that is programmed with the selected mode during manufacture. In another example, the mode control circuit 81 can include a programmable memory that is programmed with the selected mode during power-up.

The clock generation circuit 83 generates a clock signal CLK, which has a frequency that changes based on the state of the mode signal MODE. In one embodiment, the mode signal MODE operates the charge pump 80 in a selected mode chosen from three or more modes including a first mode, a second mode, and a third mode. Additionally, the clock generation circuit 83 controls the clock signal CLK to a first frequency $f_1$ in the first mode, controls the clock signal CLK to a second frequency $f_2$ in the second mode, and controls the clock signal CLK to a third frequency $f_3$ in the third mode.

The oscillation frequency of a charge pump's clock signal can impact the charge pump's performance. For example, operating a charge pump with a relatively fast clock signal can increase a charge output rate and speed-up the charge pump's settling time. However, operating a charge pump with a fast clock signal can also undesirably increase output ripple and/or steady-state power consumption relative to a configuration using a clock signal that oscillates at a slower frequency. The illustrated configuration controls the oscillation frequency of the charge pump's clock signal based on a selected mode of operation, and therefore helps to achieve a desired trade-off between output ripple and settling time.

The capacitor charging circuit 82 receives the clock signal CLK, a first power high supply voltage $V_{DD1}$, a second power high supply voltage $V_{DD2}$, and a third power high supply voltage $V_{DD3}$. The capacitor charging circuit 82 further receives the mode signal MODE. In one embodiment, the mode signal MODE operates the charge pump 80 in a selected mode chosen from three or more modes including a first mode, a second mode, and a third mode. When the mode signal MODE indicates that the charge pump 70 operates in the first mode of operation, the capacitor charging circuit 82 charges the switched capacitors 87 in part using the first power high supply voltage $V_{DD1}$. Additionally, when the mode signal MODE indicates that the charge pump 70 operates in the second mode or third mode of operation, the capacitor charging circuit 82 charges the switched capacitors 87 in part using the second power high supply voltage $V_{DD2}$ or the third power high supply voltage $V_{DD3}$, respectively. The charging operations of the capacitor charging circuit 82 are controlled based on timing of the clock signal CLK.

Thus, in the illustrated configuration, the capacitor charging circuit 82 can charge the switched capacitors 87 to a power supply voltage selected from at least three power high voltages. Although FIG. 4A illustrates a configuration in which the capacitor charging circuit 82 receives three power high supply voltages, the capacitor charging circuit 82 can receive more or fewer power high supply voltages. The selected power supply voltage can be chosen based on the state of the mode signal MODE. Although the illustrated configuration provides an example in which the capacitor charging circuit 82 operates using a power supply voltage selected from one of three power high supply voltages, the teachings herein are also applicable to configurations in which a capacitor charging circuit operates using one of four or more power high supply voltages. Furthermore, the teachings herein are applicable to configurations in which a power low supply voltage of the charging circuit 82 is controlled based on the mode of operation.

The charge pump switches 84 operate in conjunction with the capacitor charging circuit 82 to control the voltage across the switched capacitors 87 during different clock signal phases. In certain configurations, the voltage across each of the switched capacitors 87 during charging can be controlled based on a state of the mode signal to be about equal to $V_{DD1}-V_{SS}$, about equal to $V_{DD2}-V_{SS}$, or about equal to $V_{DD3}-V_{SS}$.

The illustrated charge pump filter 88 is used to filter the charge pump output voltage generated on the charge pump output voltage terminal $V_{CP}$. In the illustrated configuration, the mode control circuit 81 is further configured to control a filtering characteristic of the charge pump filter 88 based on the mode signal MODE. For example, the mode control circuit 81 can control at least one of a filter resistance or a filter capacitance of the charge pump filter 88 to control an amount of filtering provided by the charge pump filter 88.

The charge pump 70 can provide digital control over a trade-off between output ripple and settling time. By selecting a mode of operation associated with an appropriate clock frequency, charging voltage, and output filtering, a desired trade-off between output ripple and settling time for a particular application can be achieved.

By providing a charge pump that can be controlled in this manner, the charge pump can be used in a variety of applications associated with different output ripple and/or settling time specifications. For instance, an integrated circuit that includes the charge pump can have a digitally programmable output ripple versus settling time profile which can enable the integrated circuit to be used in a wide range of applications associated with different performance specifications and/or to have a performance that dynamically changes over time based on operating conditions or needs.

Figure 4B:
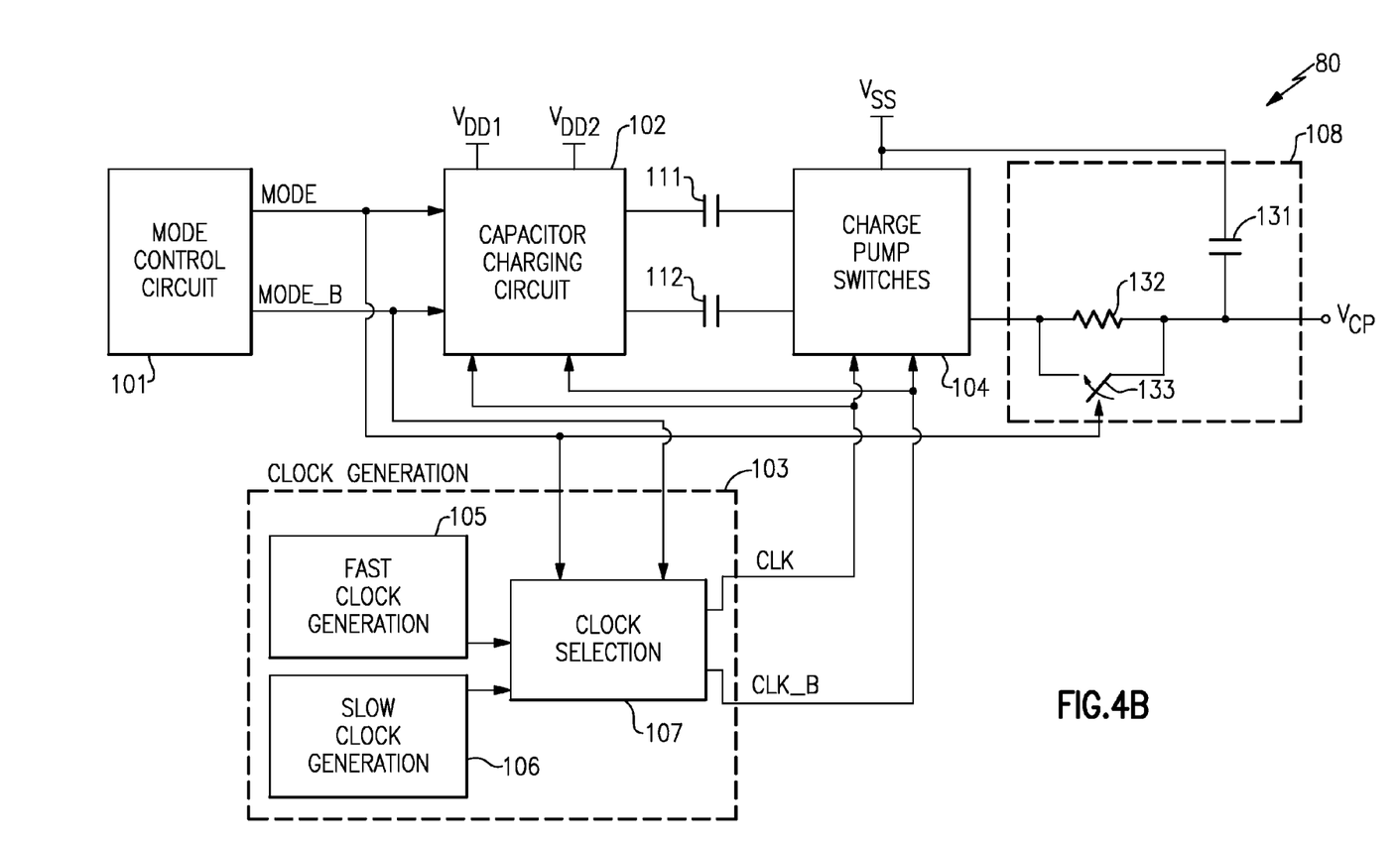
FIG. 4B is a circuit diagram of another embodiment of a charge pump.

FIG. 4B is a circuit diagram of another embodiment of a charge pump 80. The charge pump 80 includes a mode control circuit 101, a capacitor charging circuit 102, a clock generation circuit 103, charge pump switches 104, a first switched or flying capacitor 111, a second switched capacitor 112, and a charge pump filter 108 that includes a filter capacitor 131, a filter resistor 132, and a resistor bypass switch 133.

As shown in FIG. 4B, the charge pump 80 generates a charge pump output voltage on a charge pump output voltage terminal $V_{CP}$. Although the charge pump 80 is illustrated in an open-loop configuration, the charge pump 80 can also be used closed-loop.

The mode control circuit 101 can operate the charge pump 80 in a selected mode of operation. In the illustrated configuration, the mode control circuit 101 can operate the charge pump 80 in either a first mode associated with the non-inverted mode signal MODE being logically high and the inverted mode signal MODE_B being logically low, or in a second mode associated with the non-inverted mode signal MODE being logically low and the inverted mode signal MODE_B being logically high. In the illustrated configuration, the non-inverted and inverted mode signals MODE, MODE_B collectively operate as a charge pump mode signal. Although the illustrated configuration provides an example in which a charge pump operates in one of two modes, the teachings herein are also applicable to configurations in which a mode control circuit operates the charge pump in a selected mode chosen from three or more modes.

In certain configurations, the mode control circuit 101 receives a mode select signal for determining which mode to operate the charge pump 80 in. For example, the mode selected signal can be provided from a control circuit of a wireless device, such as the control component 18 of FIG. 2. In other configurations, the mode control circuit 101 includes a programmable memory including data corresponding to the selected mode of operation. In one example, the mode control circuit 101 can include a non-volatile memory that is programmed with the selected mode during manufacture. In another example, the mode control circuit 101 can include a programmable memory that is programmed with the selected mode during power-up.

The clock generation circuit 103 includes a fast clock generation circuit 105 that generate a first or fast clock signal, a slow clock generation circuit 106 that generates a second or slow clock signal, and a clock selection circuit 107. Additionally, the clock selection circuit 107 generates a non-inverted clock signal CLK and an inverted clock signal CLKB based on selecting between the fast and slow clock signals using the non-inverted and inverted mode signals MODE, MODE_B. For example, when the non-inverted and inverted mode selection signals MODE, MODE_B indicate that the charge pump 80 operates in the first mode of operation, the clock selection circuit 107 generates the non-inverted and inverted clock signals CLK, CLKB based on selecting the fast clock signal. Additionally, when the non-inverted and inverted mode selection signals MODE, MODE_B indicate that the charge pump 80 operates in the second mode of operation, the clock selection circuit 107 generates the non-inverted and inverted clock signals CLK, CLKB based on selecting the slow clock signal. In the illustrated configuration, the non-inverted and inverted clock signals CLK, CLKB collectively operate as a charge pump clock signal.

The oscillation frequency of a charge pump's clock signal can impact the charge pump's performance. For example, operating a charge pump with a relatively fast clock signal can increase a charge output rate and speed-up the charge pump's settling time. However, operating a charge pump with a fast clock signal can also undesirably increase output ripple and/or steady-state power consumption relative to a configuration using a clock signal that oscillates at a slower frequency. The illustrated configuration controls the oscillation frequency of the charge pump's clock signal based on a selected mode of operation, and therefore helps to achieve a desired trade-off between output ripple and settling time.

Although the illustrated configuration provides an example in which a clock generation circuit generates a clock signal by selecting between one of two clock signals of different oscillation frequencies, the teachings herein are also applicable to configurations in which a clock generation circuit can generate a clock signal of three or more different oscillation frequencies. Furthermore, although FIG. 4B illustrates a configuration including multiple oscillators or generators, the teachings herein are applicable to configurations including a single oscillator with tunable frequency.

The capacitor charging circuit 102 receives the non-inverted clock signal CLK, the inverted clock signal CLKB, a first power high supply voltage $V_{DD1}$, and a second power high supply voltage $V_{DD2}$. The capacitor charging circuit 102 further receives the non-inverted and inverted mode selection signals MODE, MODE_B, which the capacitor charging circuit 102 can use to select a power supply voltage for charging the first and second switched capacitors 111, 112. For example, when the non-inverted and inverted mode selection signals MODE, MODE_B indicate that the charge pump 80 operates in the first mode of operation, the capacitor charging circuit 102 can charge the first and second switched capacitors 111, 112 in part using the first power high supply voltage $V_{DD1}$. Additionally, when the non-inverted and inverted mode selection signals MODE, MODE_B indicate that the charge pump 80 operates in the second mode of operation, the capacitor charging circuit 102 can charge the first and second switched capacitors 111, 112 in part using the second power high supply voltage $V_{DD2}$ in response to clock signal transitions.

Thus, in the illustrated configuration, the capacitor charging circuit 102 can charge the first and second switched capacitors 111, 112 to a power supply voltage selected from the first power high voltage $V_{DD1}$ and the second power high voltage $V_{DD2}$. The selected voltage can be chosen based on the selected mode of operation of the charge pump 80.

Although the illustrated configuration provides an example in which the capacitor charging circuit 102 operates using a power high supply selected from one of two power high supply voltages, the teachings herein are also applicable to configurations in which a capacitor charging circuit operates using one of three or more power high supply voltages. Furthermore, the teachings herein are applicable to configurations in which a power low supply voltage of the charging circuit 102 is controlled based on the mode of operation.

The charge pump switches 104 operate in conjunction with the capacitor charging circuit 102 to control the voltage across the first and second switched capacitors 111, 112 during different clock signal phases. In certain configurations, the voltage across each of the first and second switched capacitors 111, 112 during charging can be controlled based on a state of the mode signal to be either about equal to $V_{DD1}-V_{SS}$ or about equal to $V_{DD2}-V_{SS}$. Thus, when the charge pump 80 operates in the first mode, the charge pump's output voltage can be about equal to $-V_{DD1}$ relative to the power low supply voltage $V_{SS}$. Additionally, when the charge pump 80 operates in the second mode, the charge pump's output voltage can be about equal to $-V_{DD2}$ relative to the power low supply voltage $V_{SS}$.

The illustrated charge pump 80 also includes the charge pump filter 108, which includes the filter capacitor 131, the filter resistor 132, and the resistor bypass switch 133. In the illustrated configuration, the mode control circuit 101 is further configured to control the resistance of the charge pump filter 108 based on the selected mode. For example, when the charge pump 80 operates in the first mode of operation, the filter resistor 132 can be bypassed using the resistor bypass switch 133 to provide the charge pump with fast settling time. However, when the charge pump 80 operates in the second mode of operation, the resistor bypass switch 133 can be turned off, and the filter resistor 132 and the filter capacitor 133 can operate as a RC filter that provides small output ripple.

Although the illustrated configuration provides an example in which a filter resistor is selectively bypassed based on a mode of operation, the teachings herein are applicable to other configurations. In one example, a single tunable resistor can be used. In another example, the charge pump filter 108 includes two or more filter resistors of different values, and a different filter resistance can be provided for different operating modes.

Figure 5:
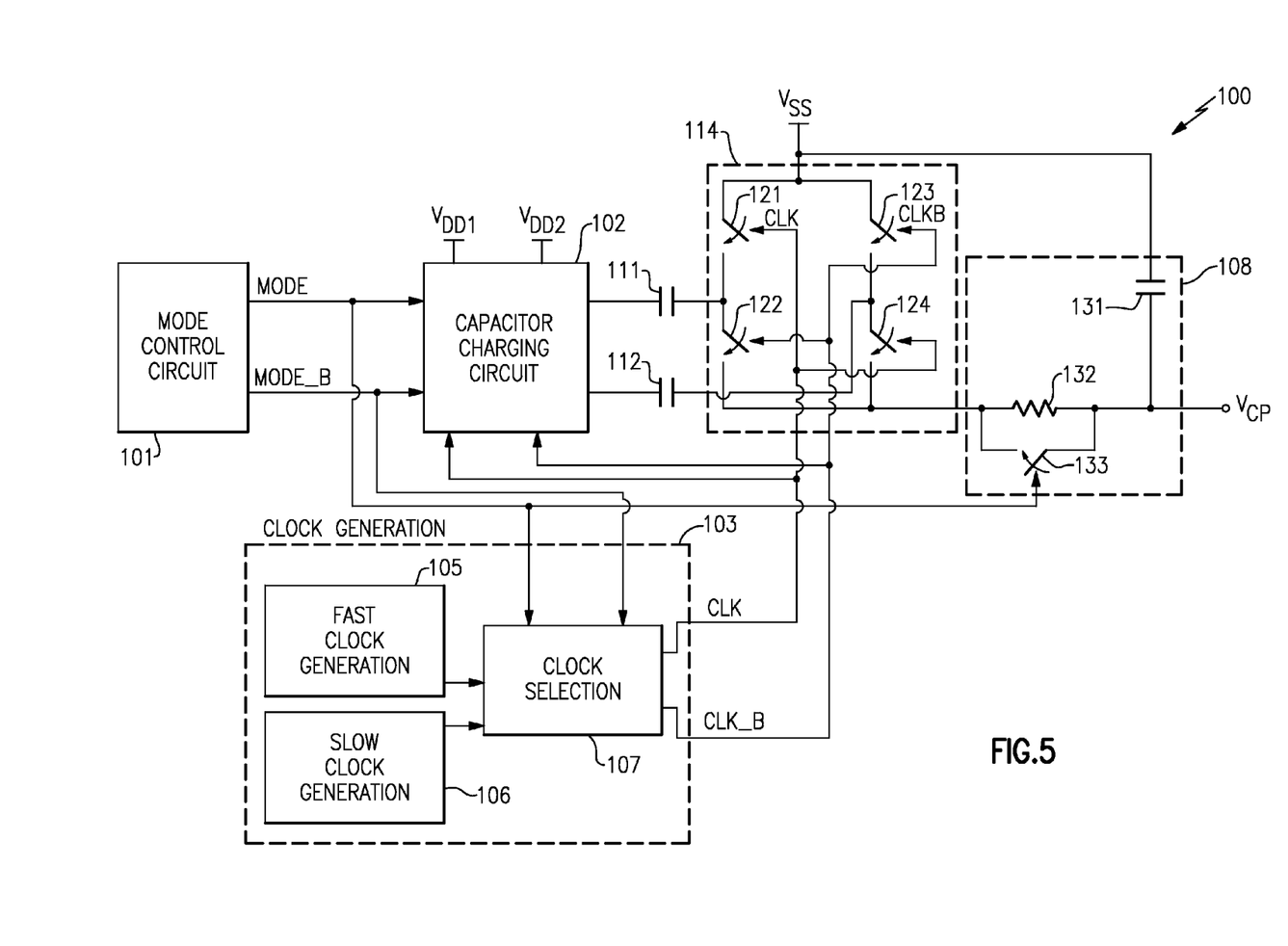
FIG. 5 is a circuit diagram of another embodiment of a charge pump.

FIG. 5 is a circuit diagram of one embodiment of a charge pump 100. The charge pump 100 includes a mode control circuit 101, a capacitor charging circuit 102, a clock generation circuit 103, a first switched capacitor 111, a second switched capacitor 112, charge pump switches 114 including first to fourth switches 121-124, and a charge pump filter 108 that includes a filter capacitor 131, a filter resistor 132, and a resistor bypass switch 133.

As shown in FIG. 5, the charge pump 100 generates a charge pump output voltage on a charge pump output voltage terminal $V_{CP}$. Although the charge pump 100 is illustrated in an open-loop configuration, the charge pump 100 can also be used closed-loop.

The mode control circuit 101 can operate the charge pump 100 in a selected mode of operation. In the illustrated configuration, the mode control circuit 101 can operate the charge pump 100 in either a first mode associated with the non-inverted mode signal MODE being logically high and the inverted mode signal MODE_B being logically low, or in a second mode associated with the non-inverted mode signal MODE being logically low and the inverted mode signal MODE_B being logically high. In the illustrated configuration, the non-inverted and inverted mode signals MODE, MODE_B collectively operate as a charge pump mode signal. Although the illustrated configuration provides an example in which a charge pump operates in one of two modes, the teachings herein are also applicable to configurations in which a mode control circuit operates the charge pump in a selected mode chosen from three or more modes.

In certain configurations, the mode control circuit 101 receives a mode select signal for determining which mode to operate the charge pump 100 in. For example, the mode selected signal can be provided from a control circuit of a wireless device, such as the control component 18 of FIG. 2. In other configurations, the mode control circuit 101 includes a programmable memory including data corresponding to the selected mode of operation. In one example, the mode control circuit 101 can include a non-volatile memory that is programmed with the selected mode during manufacture. In another example, the mode control circuit 101 can include a programmable memory that is programmed with the selected mode during power-up.

The clock generation circuit 103 includes a fast clock generation circuit 105 that generate a first or fast clock signal, a slow clock generation circuit 106 that generates a second or slow clock signal, and a clock selection circuit 107. Additionally, the clock selection circuit 107 generates a non-inverted clock signal CLK and an inverted clock signal CLKB based on selecting between the fast and slow clock signals using the non-inverted and inverted mode signals MODE, MODE_B. For example, when the non-inverted and inverted mode selection signals MODE, MODE_B indicate that the charge pump 100 operates in the first mode of operation, the clock selection circuit 107 generates the non-inverted and inverted clock signals CLK, CLKB based on selecting the fast clock signal. Additionally, when the non-inverted and inverted mode selection signals MODE, MODE_B indicate that the charge pump 100 operates in the second mode of operation, the clock selection circuit 107 generates the non-inverted and inverted clock signals CLK, CLKB based on selecting the slow clock signal. In the illustrated configuration, the non-inverted and inverted clock signals CLK, CLKB collectively operate as a charge pump clock signal.

The oscillation frequency of a charge pump's clock signal can impact the charge pump's performance. For example, operating a charge pump with a relatively fast clock signal can increase a charge output rate and speed-up the charge pump's settling time. However, operating a charge pump with a fast clock signal can also undesirably increase output ripple and/or steady-state power consumption relative to a configuration using a clock signal that oscillates at a slower frequency. The illustrated configuration controls the oscillation frequency of the charge pump's clock signal based on a selected mode of operation, and therefore helps to achieve a desired trade-off between output ripple and settling time.

Although the illustrated configuration provides an example in which a clock generation circuit generates a clock signal by selecting between one of two clock signals of different oscillation frequencies, the teachings herein are also applicable to configurations in which a clock generation circuit can generate a clock signal of three or more different oscillation frequencies. Furthermore, although FIG. 5 illustrates a configuration including multiple oscillators or generators, the teachings herein are applicable to configurations including a single oscillator with tunable frequency.

The capacitor charging circuit 102 receives the non-inverted clock signal CLK, the inverted clock signal CLKB, a first power high supply voltage $V_{DD1}$, and a second power high supply voltage $V_{DD2}$. The capacitor charging circuit 102 further receives the non-inverted and inverted mode selection signals MODE, MODE_B, which the capacitor charging circuit 102 can use to select a power supply voltage for charging the first and second switched capacitors 111, 112. For example, when the non-inverted and inverted mode selection signals MODE, MODE_B indicate that the charge pump 100 operates in the first mode of operation, the capacitor charging circuit 102 can charge the first and second switched capacitors 111, 112 in part using the first power high supply voltage $V_{DD1}$. Additionally, when the non-inverted and inverted mode selection signals MODE, MODE_B indicate that the charge pump 100 operates in the second mode of operation, the capacitor charging circuit 102 can charge the first and second switched capacitors 111, 112 in part using the second power high supply voltage $V_{DD2}$ in response to clock signal transitions.

Thus, in the illustrated configuration, the capacitor charging circuit 102 can charge the first and second switched capacitors 111, 112 to a power supply voltage selected from the first power high voltage $V_{DD1}$ and the second power high voltage $V_{DD2}$. The selected voltage can be chosen based on the selected mode of operation of the charge pump 100.

Although the illustrated configuration provides an example in which the capacitor charging circuit 102 operates using a power high supply selected from one of two power high supply voltages, the teachings herein are also applicable to configurations in which a capacitor charging circuit operates using one of three or more power high supply voltages. Furthermore, the teachings herein are applicable to configurations in which a power low supply voltage of the charging circuit 102 is controlled based on the mode of operation.

The first to fourth switches 121-124 can operate in conjunction with the capacitor charging circuit 102 to control the voltage across the first and second switched capacitors 111, 112 during different clock signal phases. For example, during a first clock signal phase of the clock signal CLK, the capacitor charging circuit 102 can electrically connected a first end of the first charging capacitor 111 to either the first power high supply voltage $V_{DD1}$ or the second power high supply voltage $V_{DD2}$ based on the charge pump's mode of operation. Additionally, during the first clock signal phase of the clock signal CLK, the first switch 121 can close to electrically connect a second end of the first switched capacitor 111 to the power low supply voltage $V_{SS}$. Furthermore, during a second clock signal phase of the clock signal CLK, the capacitor charging circuit 102 can electrically connect the first end of the first charging capacitor 111 to the power low supply voltage $V_{SS}$, and the second switch 122 can electrically connect the second end of the first charging capacitor 111 to the charge pump output voltage terminal $V_{CP}$.

Additionally, during the second clock signal phase of the clock signal CLK, the capacitor charging circuit 102 can electrically connected a first end of the second charging capacitor 112 to either the first power high supply voltage $V_{DD1}$ or the second power high supply voltage $V_{DD2}$ based on the charge pump's mode of operation. Furthermore, during the second clock signal phase of the clock signal CLK, the second switch 123 can close to electrically connect a second end of the second switched capacitor 111 to the power low supply voltage $V_{SS}$. Furthermore, during the first clock signal phase of the clock signal CLK, the capacitor charging circuit 102 can electrically connect the first end of the second charging capacitor 112 to the power low supply voltage $V_{SS}$, and the fourth switch 124 can electrically connect the second end of the second charging capacitor 112 to the charge pump output voltage terminal $V_{CP}$.

Accordingly, the voltage across each of the first and second switched capacitors 111, 112 during charging can be controlled based on a state of the mode signal to be either about equal to $V_{DD1}-V_{SS}$ or about equal to $V_{DD2}-V_{SS}$. Thus, when the charge pump 100 operates in the first mode, the charge pump's output voltage can be about equal to $-V_{DD1}$ relative to the power low supply voltage $V_{SS}$. Additionally, when the charge pump 100 operates in the second mode, the charge pump's output voltage can be about equal to $-V_{DD2}$ relative to the power low supply voltage $V_{SS}$.

In certain configurations, a maximum voltage outputted by a charge pump may be limited by voltage overstress and/or reliability considerations of transistors that receive the charge pump output voltage. For example, in configurations in which a metal oxide semiconductor field effect transistor (MOSFET) is used as a switch, such as in silicon on insulator (SOI) RF switch applications, the MOSFET may be rated to have a maximum gate-to-drain and/or gate-to-source voltage of, for instance, 2.5 V. It can be desirable for a charge pump to generate a charge pump output voltage compliant with overstress and/or reliability specifications.

In the illustrated configuration, the voltage levels of the first and second power high supply voltages $V_{DD1}$, $V_{DD2}$ can be selected such that the charge pump's output voltage meets voltage overstress and/or reliability considerations of transistors that receive the charge pump output voltage. For example, the first power high supply voltage $V_{DD1}$ can be selected to be less than or equal to a maximum transistor overstress voltage, and the second power high supply voltage $V_{DD2}$ can be selected to be less than the first power high supply voltage $V_{DD1}$.

In contrast, certain conventional charge pumps meet voltage reliability specifications by utilizing a resistor-drop or diode-drop in series with a single fixed-voltage power high supply to provide a charge pump output voltage that has a magnitude less than that of the fixed-voltage power high supply. While such a configuration may generate a charge pump output voltage of a desired magnitude, configuring a charge pump in this manner can significantly increase charge pump settling time and/or I*R power loss.

The illustrated charge pump 150 also includes a charge pump filter 108, which includes the filter capacitor 131, the filter resistor 132, and the resistor bypass switch 133. In the illustrated configuration, the mode control circuit 101 is further configured to control the resistance of the charge pump filter 108 based on the selected mode. For example, when the charge pump 100 operates in the first mode of operation, the filter resistor 132 can be bypassed using the resistor bypass switch 133 to provide the charge pump with fast settling time. However, when the charge pump 100 operates in the second mode of operation, the resistor bypass switch 133 can be turned off, and the filter resistor 132 and the filter capacitor 133 can operate as a RC filter that provides small output ripple.

Although the illustrated configuration provides an example in which a filter resistor is selectively bypassed based on a mode of operation, the teachings herein are applicable to other configurations. In one example, a single tunable resistor can be used. In another example, the charge pump filter 108 includes two or more filter resistors of different values, and a different filter resistance can be provided for different operating modes.

Figure 6:
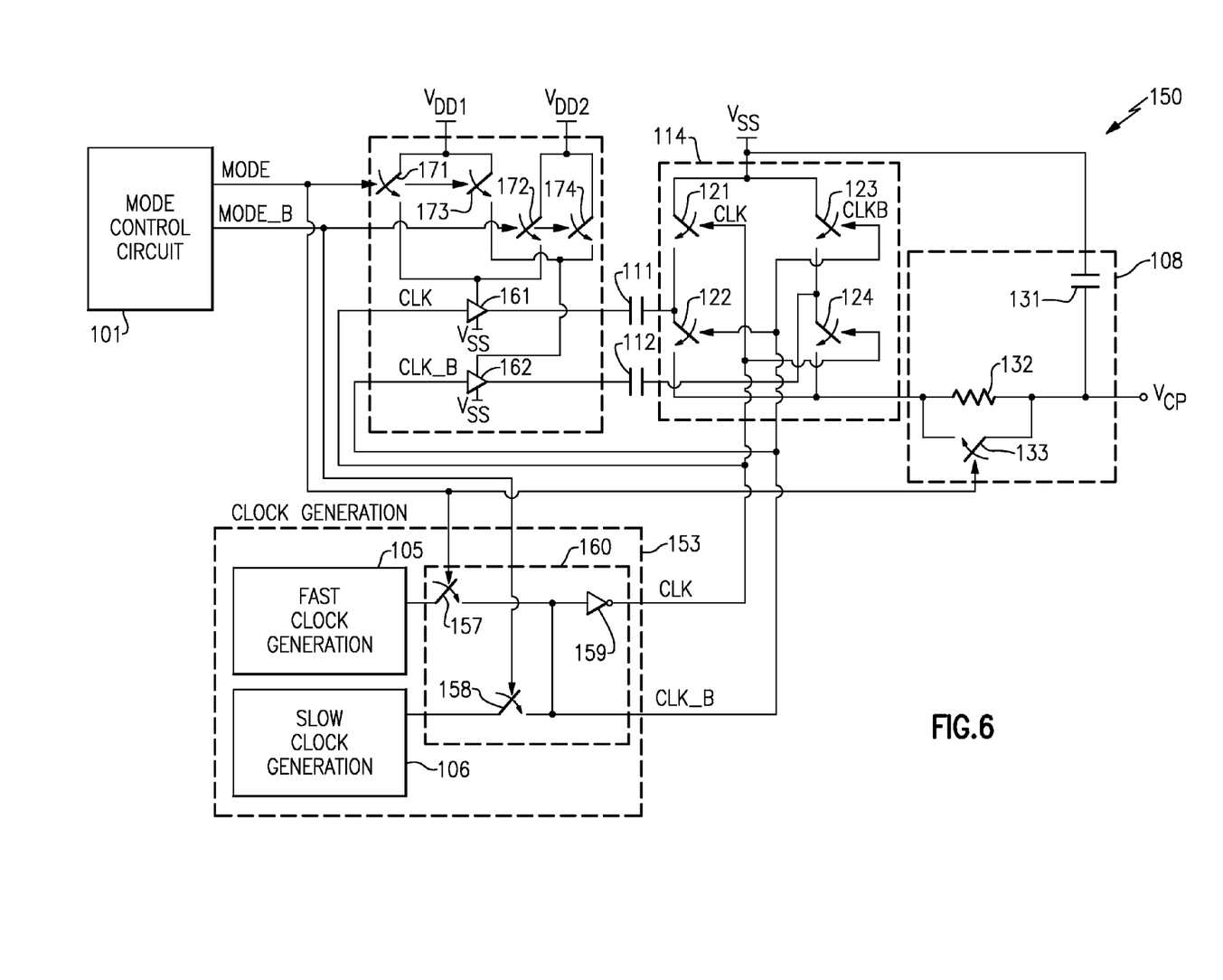
FIG. 6 is a circuit diagram of another embodiment of a charge pump.

FIG. 6 is a circuit diagram of another embodiment of a charge pump 150. The charge pump 150 of FIG. 6 is similar to the charge pump 100 of FIG. 5, except that the charge pump 150 includes a different implementation of a capacitor charging circuit 152 and a clock generation circuit 153.

For example, the clock generation circuit 153 includes the fast and slow clock generation circuits 105, 106 and a clock selection circuit including a first clock selection switch 157, a second clock selection switch 158, and an inverter 159. When the non-inverted mode signal MODE is logically high, the first clock selection switch 157 can close and the second clock selection switch 158 can open, thereby generating the non-inverted and inverted clock signals CLK, CLKB using the fast clock generation circuit 105. Additionally, when the non-inverted mode signal MODE is logically low, the first clock selection switch 157 can open and the second clock selection switch 158 can close, thereby generating the non-inverted and inverted clock signals CLK, CLKB using the slow clock generation circuit 106.

The capacitor charging circuit 152 includes a first buffer 161 that receives the non-inverted clock signal CLK and controls a voltage level of the first end of the first switching capacitor 111. The capacitor charging circuit 152 further includes a second buffer 162 that receives the inverted clock signal CLKB and controls a voltage level of the first end of the second switching capacitor 112. The capacitor charging circuit 152 further includes first to fourth power supply selection switches 171-174 used to control a power high supply of the capacitor charging circuit 152. For example, when the charge pump 150 operates in the first mode, the first and second buffers 161, 162 are powered using the first power high supply voltage $V_{DD1}$ and the power low supply voltage $V_{SS}$. Additionally, when the charge pump 150 operates in the second mode, the first and second buffers 161, 162 are powered using the second power high supply voltage $V_{DD2}$ and the power low supply voltage $V_{SS}$. The first power high supply voltage $V_{DD1}$ can be selected to have a voltage level greater than that of the second power high supply voltage $V_{DD2}$.

Accordingly, the illustrated charge pump 150 can be operated in either a fast oscillation frequency/high power supply voltage mode to speed-up settling time or a slow oscillation frequency/low power supply voltage mode associated with small output ripple.

Additional details of the charge pump 150 can be similar to those described earlier.

Figure 7A:
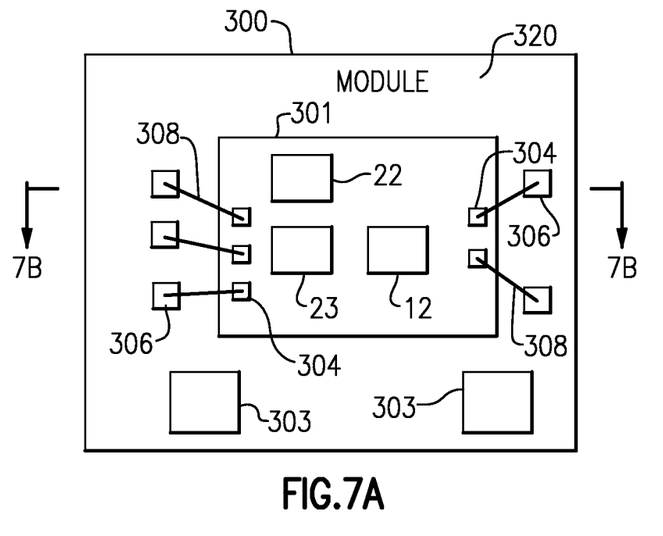
FIG. 7A is a schematic diagram of one embodiment of a packaged module.
Figure 7B:
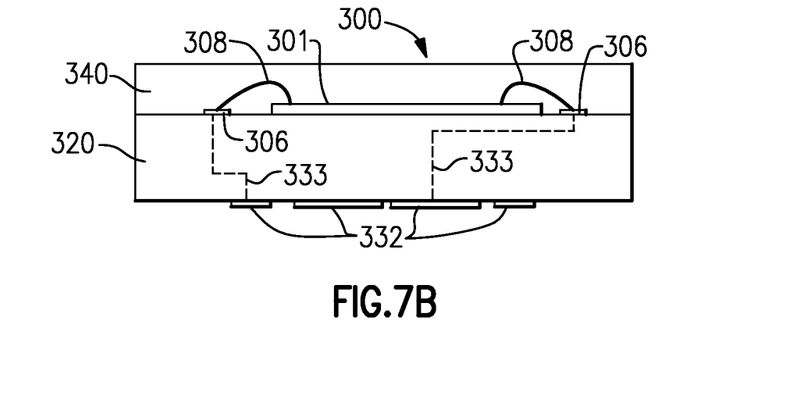
FIG. 7B is a schematic diagram of a cross-section of the packaged module of FIG. 7A taken along the lines 7B-7B.

FIG. 7A is a schematic diagram of one embodiment of a packaged module 300. FIG. 7B is a schematic diagram of a cross-section of the packaged module 300 of FIG. 7A taken along the lines 7B-7B.

The packaged module 300 includes an IC or die 301, surface mount components 303, wirebonds 308, a package substrate 320, and encapsulation structure 340. The package substrate 320 includes pads 306 formed from conductors disposed therein. Additionally, the die 301 includes pads 304, and the wirebonds 308 have been used to electrically connect the pads 304 of the die 301 to the pads 306 of the package substrate 301.

As illustrated in FIGS. 10A and 10B, the die 301 includes a charge pump 22, a switch controller 23, and switches 12, which can be as described earlier.

The packaging substrate 320 can be configured to receive a plurality of components such as the die 301 and the surface mount components 303, which can include, for example, surface mount capacitors and/or inductors.

As shown in FIG. 7B, the packaged module 300 is shown to include a plurality of contact pads 332 disposed on the side of the packaged module 300 opposite the side used to mount the die 301. Configuring the packaged module 300 in this manner can aid in connecting the packaged module 300 to a circuit board such as a phone board of a wireless device. The example contact pads 332 can be configured to provide RF signals, bias signals, power low voltage(s) and/or power high voltage(s) to the die 301 and/or the surface mount components 303. As shown in FIG. 7B, the electrically connections between the contact pads 332 and the die 301 can be facilitated by connections 333 through the package substrate 320. The connections 333 can represent electrical paths formed through the package substrate 320, such as connections associated with vias and conductors of a multilayer laminated package substrate.

In some embodiments, the packaged module 300 can also include one or more packaging structures to, for example, provide protection and/or facilitate handling of the packaged module 300. Such a packaging structure can include overmold or encapsulation structure 340 formed over the packaging substrate 320 and the components and die(s) disposed thereon.

It will be understood that although the packaged module 300 is described in the context of electrical connections based on wirebonds, one or more features of the present disclosure can also be implemented in other packaging configurations, including, for example, flip-chip configurations.

Applications

Some of the embodiments described above have provided examples in connection with wireless devices or mobile phones. However, the principles and advantages of the embodiments can be used for any other systems or apparatus that have needs for charge pumps.

Such charge pumps can be implemented in various electronic devices. Examples of the electronic devices can include, but are not limited to, consumer electronic products, parts of the consumer electronic products, electronic test equipment, etc. Examples of the electronic devices can also include, but are not limited to, memory chips, memory modules, circuits of optical networks or other communication networks, and disk driver circuits. The consumer electronic products can include, but are not limited to, a mobile phone, a telephone, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A charge pump comprising:
    a mode control circuit configured to operate the charge pump in a selected mode chosen from a plurality of modes;
    a clock generation circuit configured to generate a charge pump clock signal having an oscillation frequency that is based on the selected mode, the charge pump clock signal having a first phase and a second phase;
    two or more switched capacitors including a first switched capacitor and a second switched capacitor; and
    a capacitor charging circuit configured to charge the two or more switched capacitors based on a power high supply voltage of the capacitor charging circuit and on timing of the charge pump clock signal, the capacitor charging circuit configured to charge a first end of the first switched capacitor with the power high supply voltage and a second end of the first switched capacitor with a power low supply voltage during the first phase, and to charge a first end of the second switched capacitor with the power high supply voltage and a second end of the second switched capacitor with the power low supply voltage during the second phase, the power high supply voltage having a voltage level that is based on the selected mode.

2. The charge pump of claim 1 further comprising a charge pump filter configured to filter a charge pump output voltage of the charge pump, the charge pump filter having a filtering characteristic that is based on the selected mode.

3. The charge pump of claim 2 wherein the filtering characteristic includes a resistance of the charge pump filter.

4. The charge pump of claim 1 wherein the capacitor charging circuit includes a plurality of power supply selection switches configured to choose the power high supply voltage of the capacitor charging circuit from two or more power high supply voltages based on the selected mode.

5. The charge pump of claim 1 wherein the clock generation circuit includes a first clock generator configured to generate a first clock signal, a second clock generator configured to generate a second clock signal that has a slower oscillation frequency than the first clock signal, and a clock selection circuit configured to generate the charge pump clock signal based on selecting amongst a plurality of clock signals including the first clock signal and the second clock signal.

6. The charge pump of claim 1 wherein the capacitor charging circuit includes a first charge pump switch configured to electrically connect the second end of the first switched capacitor to the power low supply voltage during the first phase, a second charge pump switch configured to electrically connect the second end of the first switched capacitor to a charge pump output during the second phase, a third charge pump switch configured to electrically connect the second end of the second switched capacitor to the power low supply voltage during the second phase, and a fourth charge pump switch configured to electrically connect the second end of the second switched capacitor to the charge pump output during the first phase.

7. The charge pump of claim 6 wherein the capacitor charging circuit is further configured to electrically connect the first end of the first switched capacitor to the power low supply voltage during the second phase, and to electrically connect the first end of the second switched capacitor to the power low supply voltage during the first phase.

8. The charge pump of claim 1 wherein the two or more modes includes at least three modes.

9. A method of generating a charge pump output voltage, the method comprising:
    selecting a mode of operation of a charge pump using a mode control circuit, the selected mode chosen from a plurality of modes;
    controlling a frequency of a charge pump clock signal based on the selected mode using a clock generation circuit, the charge pump clock signal having a first phase and a second phase;
    charging two or more switched capacitors using a capacitor charging circuit based on a power high supply voltage of the capacitor charging circuit and on timing of the charge pump clock signal, including charging a first end of a first switched capacitor with the power high supply voltage and a second end of the first switched capacitor with a power low supply voltage during the first phase, and charging a first end of a second switched capacitor with the power high supply voltage and a second end of the second switched capacitor with the power low supply voltage during the second phase; and
    controlling a voltage level of the power high supply voltage of the capacitor charging circuit based on the selected mode.

10. The method of claim 9 further comprising controlling a resistance of a charge pump filter based on the selected mode.

11. The method of claim 9 further comprising generating a plurality of clock signals having different frequencies, and selecting amongst the plurality of clock signals to generate the charge pump clock signal.

12. The method of claim 9 wherein controlling the voltage level of the power high supply voltage includes selecting the power high supply voltage from two or more power high supply voltages based on the selected mode.

13. The method of claim 9 further comprising electrically connecting the second end of the first switched capacitor to a charge pump output during the second phase and electrically connecting the second end of the second switched capacitor to the charge pump output during the first phase.

14. A radio frequency system comprising:
a power amplifier configured to generate an amplified radio frequency signal;
a switch including an input configured to receive the amplified radio frequency signal;
a switch controller configured to receive a charge pump output voltage and to control a state of the switch;
a charge pump configured to generate the charge pump output voltage, the charge pump including a mode control circuit configured to operate the charge pump in a selected mode chosen from a plurality of modes, the charge pump further including a clock generation circuit configured to generate a charge pump clock signal having an oscillation frequency that is based on the selected mode and having a first phase and a second phase, the charge pump further including two or more switched capacitors including a first switched capacitor and a second switched capacitor, and a capacitor charging circuit configured to charge the two or more switched capacitors based on a power high supply voltage of the capacitor charging circuit and on timing of the charge pump clock signal, the capacitor charging circuit configured to charge a first end of the first switched capacitor with the power high supply voltage and a second end of the first switched capacitor with a power low supply voltage during the first phase, and to charge a first end of the second switched capacitor with the power high supply voltage and a second end of the second switched capacitor with the power low supply voltage during the second phase, the power high supply voltage having a voltage level that is based on the selected mode.

15. The radio frequency system of claim 14 wherein the charge pump further includes a charge pump filter configured to filter the charge pump output voltage, the charge pump filter having a filtering characteristic that is based on the selected mode.

16. The radio frequency system of claim 15 wherein the filtering characteristic includes a filter resistance of the charge pump filter.

17. The radio frequency system of claim 14 wherein the capacitor charging circuit includes a plurality of power supply selection switches configured to choose the power high supply voltage of the capacitor charging circuit from two or more power high supply voltages based on the selected mode.

18. The radio frequency system of claim 14 wherein the clock generation circuit includes a first clock generator configured to generate a first clock signal, a second clock generator configured to generate a second clock signal that has a slower oscillation frequency than the first clock signal, and a clock selection circuit configured to generate the charge pump clock signal based on selecting amongst a plurality of clock signals including the first clock signal and the second clock signal.

19. The radio frequency system of claim 14 wherein the two or more modes includes at least three modes.

20. The radio frequency system of claim 14 wherein the capacitor charging circuit is further configured to electrically connect the second end of the first switched capacitor to a charge pump output during the second phase and to electrically connect the second end of the second switched capacitor to the charge pump output during the first phase.

* * * * *